Patented July 31, 1951

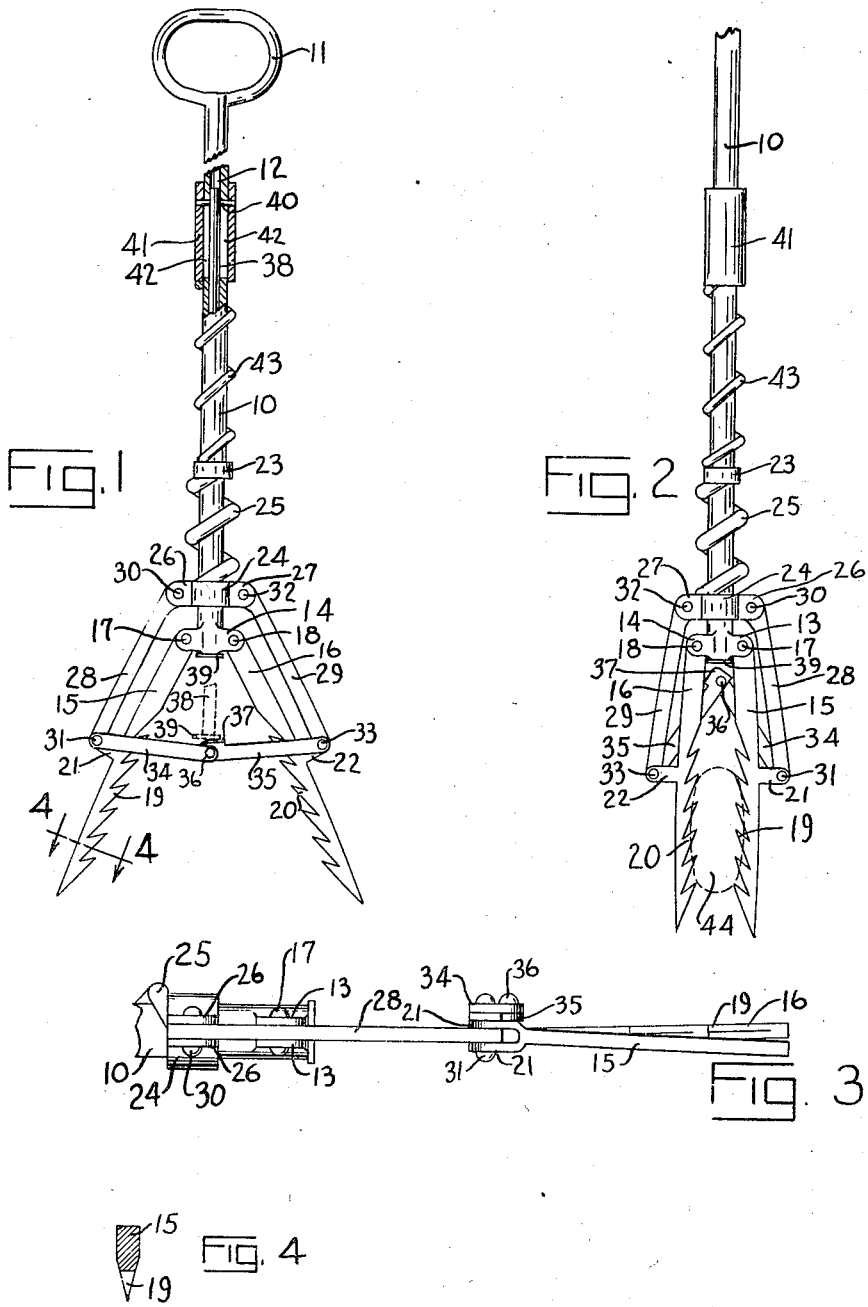

2,562,374

UNITED STATES PATENT OFFICE 2,562,374

FISH GRAB

Victor J. Benson, Minneapolis, Minn.

Application April 19, 1947, Serial No. 742,572

4 Claims. (Cl. 294—110)

1

This invention has relation to a fish grab, or device for catching fish.

An object of the invention is to provide a fish grab, or device for catching fish, which will be of novel and improved construction.

A further object is to provide a device for catching fish wherein will be incorporated desirable and improved features and characteristics of construction novel both as individual entities of the device and in combination with each other.

And a further object is to provide a fish grab, or device for catching fish, which will include features and characteristics of construction as herein illustrated and described.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible as long as within the spirit of the invention and the scope of the claims which follow.

In the accompanying drawing forming a part of this specification,

Fig. 1 is a side elevational view, partially in section and partially broken away, of a fish grab made according to the invention;

Fig. 2 is a fragmentary side elevational view disclosing the side of the fish grab opposite that shown in Fig. 1, with parts in different positions;

Fig. 3 is a fragmentary edge elevational view of the fish grab as it would appear from the left in Fig. 1; and Fig. 4 is a detail sectional view, taken on line 4—4 in Fig. 1.

A frame of the new and improved fish grab is constituted as an elongated hollow tubular member 10 integrally including a hollow handle 11 at one end alined with a passageway 12 extending longitudinally through said elongated hollow tubular member.

The end of the elongated hollow tubular member 10 spaced from the hollow handle 11 integrally supports oppositely disposed, exteriorly extending ears, denoted 13, 13 and 14, 14, respectively. The ears 13, 13 are in spaced relation at one side of the longitudinally extending passageway 12, the ears 14, 14 are in spaced relation at the opposite side of said longitudinally

2 extending passageway, and the ears 13, 14 and 13, 14 at opposite sides of the longitudinally extending passageway are in alined relation transversely of said elongated hollow tubular member 10.

Oppositely disposed, elongated grabbing elements of the fish grab are indicated 15 and 16, respectively. The elongated grabbing element 15 has its inner end portion situated between and pivotally connected, as at 17, to the ears 13, 13, the elongated grabbing element 16 has its inner end portion situated between and pivotally connected, as at 18, to the ears 14, 14, and said elongated grabbing elements 15 and 16 project from the adjacent end of the elongated hollow tubular member, or end of said elongated hollow tubular member opposite the handle 11.

The elongated grabbing elements 15 and 16 are in spaced apart relation and in substantial alinement transversely of the elongated hollow tubular member 10 and are mounted for swinging movement toward and away from each other in a plane including the longitudinal axis of said elongated hollow tubular member. The outer end portions of said elongated grabbing elements 15 and 16 include barbs or prongs, represented 19 and 20, respectively, at the interior sides of the elongated grabbing elements and in facing relation to each other. An intermediate portion of each of said elongated grabbing elements integrally supports spaced apart, exteriorly extending ears, represented 21, 21 and 22, 22, respectively. In the disclosure as made, the exteriorly extending ears 21, 21 and 22, 22 are substantially at the midlengths of the elongated grabbing elements.

A collar fixed upon an intermediate portion of the external surface of the elongated hollow tubular member 10 is designated 23, a collar slidable on said external surface of said elongated hollow tubular member at location between the fixed collar 23 and the ears 13, 13, 14, 14 is indicated 24, and a relatively strong compression coil spring upon the elongated hollow tubular member, having one of its ends engaged against the fixed collar 23 and its other end engaged against the slidable collar 24, is represented 25. The relatively strong compression coil spring 25 urges the slidable collar 24 toward the elongated grabbing elements 15 and 16.

The slidable collar 24 integrally supports oppositely disposed, exteriorly extending ears, denoted 26, 26 and 27, 27, respectively. The ears 26, 26 are in spaced relation at the side of the longitudinally extending passageway 12 adjacent the ears 13, 13, the ears 27, 27 are in spaced relation at the side of said longitudinally extending passageway adjacent the ears 14, 14, and the ears 26, 27 and 26, 27 at opposite sides of the longitudinally extending passageway are in alined relation transversely of the elongated hollow tubular member 10. The ears 26, 26 and 27, 27 project outwardly from the elongated hollow tubular member 10 a bit further than do the ears 13, 13 and 14, 14, and the ears 13, 13, 26, 26 and 14, 14, 27, 27, respectively, are in substantial alinement in direction longitudinally of said elongated hollow tubular member.

Oppositely disposed first actuator links of the fish grab are designated 28 and 29, respectively. The first actuator link 28 has its inner end portion situated between and pivotally connected, as at 30, to the ears 26, 26 and its outer end portion situated between and pivotally connected, as at 31, to the ears 21, 21, and the first actuator link 29 has its inner end portion situated between and pivotally connected, as at 32, to the ears 27, 27 and its outer end portion situated between and pivotally connected, as at 33, to the ears 22, 22.

Oppositely disposed second actuator links are represented 34 and 35, respectively. Interior end portions of said second actuator links 34 and 35 are situated substantially at the longitudinal axis of the elongated hollow tubular member 10 and are pivotally connected, at 36, to each other, an exterior end portion of the second actuator link 34 is pivotally connected, at 31, to the ears 21, 21, and an exterior end portion of the second actuator link 35 is pivotally connected, at 33, to the ears 22, 22. Said second actuator links 34 and 35 are assembled together for free relative swinging movement in direction toward said elongated hollow tubular member 10 and for limited relative swinging movement in opposite direction. More explicitly, a stop 37 upon the second actuator link 35 is adapted to become engaged against the second actuator link 34 when the second actuator links 34 and 35 are swung to position immediately beyond alined position at the outer side of said second actuator links, or side of the second actuator links opposite the elongated hollow tubular member 10, thus to limit outward swinging movement of said second actuator links.

An actuator rod 38, slidable in the longitudinally extending passageway 12 and integrally supporting an actuator button 39 upon one of its ends, has its end portion spaced from said actuator button rigidly connected, as by a cross pin 40, to an actuator piece or annular element 41 slidably situated on a portion of the external surface of the elongated hollow tubular member 10 at the side of the fixed collar 23 opposite the relatively strong compression coil spring 25. Opposite end portions of the cross pin 40 are disposed in oppositely disposed, longitudinal slots 42, 42 in said elongated hollow tubular member 10, and surfaces of the elongated hollow tubular member defining the opposite ends of said longitudinal slots 42, 42 limit the extent of possible longitudinal movement of the cross pin 40, and hence of the actuator rod 38, in the longitudinally extending passageway 12. The actuator button 39 is situated beyond the end of the elongated hollow tubular member 10 spaced from the slidable actuator piece or annular element 41, in adjacent relation to the second actuator links 34 and 35 and in substantially alined relation with the pivotal connection 36 in direction longitudinally of the fish grab. A comparatively weak compression coil spring 43, upon said elongated hollow tubular member 10, having one of its ends engaged against the fixed collar 23 and its other end engaged against the slidable actuator piece or annular element 41, normally retains said slidable actuator piece or annular element in position so that the button 39 upon the actuator rod 38 is in spaced relation to said pivotal connection 36.

The relatively strong compression coil spring 25 is constantly under compression to urge the slidable collar 24 and the first actuator links 28 and 29 and their end portions pivoted to intermediate portions of the elongated grabbing elements away from the elongated hollow tubular member 10, and also to urge the elongated grabbing elements, pivoted to the ears 13, 13, 14, 14, toward said elongated hollow tubular member. The construction and arrangement are such that said relatively strong compression coil spring 25 exerts action, through the instrumentality of the slidable collar 24 and the ears 26, 26, 27, 27, against the inner ends of the first actuator links 28 and 29 causing the outer ends of said first actuator links, pivoted to intermediate portions of the elongated grabbing elements 15 and 16, to be moved outwardly, away from the elongated hollow tubular member, and simultaneously exerts action, through the instrumentality of said slidable collar and the ears 13, 13, 14, 14, causing the inner ends of said elongated grabbing elements, privoted to said ears 13, 13, 14, 14, to be moved inwardly, toward said elongated hollow tubular member, thus to cause the elongated grabbing elements to be resiliently pressed toward each other.

The slidable actuator piece or annular element 41 and the actuator rod 38 with button 39 are for the purpose of situating the elongated grabbing elements 15 and 16 in spaced apart relation, as in Fig. 1 of the drawing, against resilient action of the relatively strong compression coil spring 25. To cause said elongated grabbing elements to be spread apart, the elongated hollow tubular member 10, or its handle 11, is grasped while the actuator piece or annular element 41, together with the actuator rod 38 and its button 39 as a unit, is manually slid, against resilient action of the comparatively weak compression coil spring 43, toward the elongated grabbing elements. Supposing the second actuator links 34 and 35, and the pivotal connection 36 between said second actuator links, to be situated as in Fig. 2 when said actuator piece or annular element 41 is slid toward said elongated gripping elements, the actuator button 39 will engage the second actuator links 34 and 35 at location adjacent said pivotal connection 36 and cause said second actuator links to be swung to the position in which disclosed in Fig. 1, and, as a consequence, obviously cause the elongated grabbing elements 15 and 16 to become spread apart. In said Fig. 1, the second actuator links 34 and 35 are swung to position outwardly of alined or dead center position and there held against further outward swinging movement by reason of engagement of the stop 37 on the second actuator link 35 with the second actuator link 34. Upon release of the slidable actuator piece or annular element 41, the comparatively weak compression coil spring 43 will cause said slidable actuator piece or annular element to be returned to its normal position, as disclosed in the drawing, but the elongated grabbing elements 15 and 16 will be retained in spaced apart relation, against tendency of the relatively strong compression coil spring 25 to cause said elongated grabbing elements to swing toward each other, by the second actuator links 34 and 35. Resilient action of said relatively strong compression coil spring tending to cause said elongated grabbing elements to be swung toward each other obviously will be resisted by engagement of the stop 37 against the second actuator link 34.

The second actuator links 34 and 35 are adapted to be swung from their position as in Fig. 1 to position inwardly of alined position in response to a blow against an outer surface or surfaces of one or both of said second actuator links, preferably at a location adjacent the pivotal connection 36. In practical use of the fish grab, the necessary blow to upset the second actuator links is provided by causing said second actuator links to be struck against a fish, such as denoted at 44 in Fig. 2, intended to be caught. Immediately when the second actuator links are swung upon the pivotal supports 31 and 33 to position inwardly of alined position, the relatively strong compression coil spring 25 will act to cause the elongated grabbing elements 15 and 16 to be swung from their spaced apart condition as in Fig. 1 toward each other in grasping relation to the fish, as in said Fig. 2.

It will be evident that the first actuator links are caused to be swung through a considerably shorter arc than are the elongated grabbing elements in response to action of the relatively strong compression coil spring 25 which causes said elongated grabbing elements to be moved from position as in Fig. 1 to position as in Fig. 2. The extent to which the elongated grabbing elements are permitted to swing toward each other can be limited by engagement of portions of the second actuator links 34 and 35 adjacent the pivotal connection 36 with the actuator button 39 while in normal position, and in the event it may be desirable that said elongated grabbing elements overlap when at their closed position, the construction and arrangement can be such that said elongated grabbing elements are slightly out of alinement in direction transversely of the fish grab, as the elongated grabbing elements are disclosed in Fig. 3 of the drawing. In any event, the construction and arrangement desirably will be such as to preclude possibility of the barbs or prongs 19 and 20 upon the elongated grabbing elements 15 and 16 coming into violent head-on contact with each other.

Evidently, the device of the invention can be employed to spear fish.

What is claimed is:

1. A fish grab comprising an elongated frame member, oppositely disposed, elongated grabbing elements extending outwardly from and having their inner end portions pivotally connected to an end portion of said elongated frame member for swinging movement toward and away from each other, barbs upon and at the interior sides of outer end portions of said elongated grabbing elements in facing relation to each other, means for resiliently urging said elongated grabbing elements to be swung toward each other constituted as an element slidably mounted on the elongated frame member adjacent the elongated grabbing elements, oppositely disposed first actuator links at the outer sides of said elongated grabbing elements having their inner end portions pivotally connected to said slidable element and their outer end portions pivotally connected to intermediate portions of said elongated grabbing elements and a compression coil spring upon said elongated frame member for urging said slidable element toward said elongated grabbing elements, and devices including second actuator links for retaining said elongated grabbing elements in spaced relation against resilient action of said means.

2. The combination as specified in claim 1 wherein there is a pivotal connection between adjacent end portions of said second actuator links, pivotal connections between spaced apart end portions of said second actuator links and intermediate portions of said elongated grabbing elements adapted to permit the second actuator links to be swung between a position where said second actuator links are in substantial alinement and a position where the second actuator links are in oblique relation at the side of said pivotal connections between said second actuator links and said elongated grabbing elements adjacent said elongated frame member and means for limiting swinging movement of said second actuator links relative to said elongated grabbing elements and to each other in direction away from said elongated frame member when the second actuator links are swung outwardly beyond alined relation.

3. The combination as specified in claim 2, and means adapted to be manually actuated to cause said second actuator links to be swung from said position where in oblique relation to position where disposed outwardly of alined relation.

4. A fish grab comprising an elongated hollow tubular member, oppositely disposed, elongated grabbing elements extending outwardly from and having their inner end portions pivotally connected to an end portion of said elongated hollow tubular member for swinging movement toward and away from each other, barbs upon and at the interior sides of outer end portions of said elongated grabbing elements in facing relation to each other, means for resiliently urging said elongated grabbing elements to be swung toward each other constituted as an element slidably mounted on the elongated hollow tubular member adjacent the elongated grabbing elements, oppositely disposed first actuator links at the outer sides of said elongated grabbing elements having their inner end portions pivotally connected to said slidable element and their outer end portions pivotally connected to intermediate portions of said elongated grabbing elements and a compression coil spring upon said elongated hollow tubular member for urging said slidable element toward said elongated grabbing elements, devices for retaining said elongated grabbing elements in spaced relation against resilient action of said means, said devices being constituted as oppositely disposed second actuator links, a pivotal connection between adjacent end portions of said second actuator links, pivotal connections between spaced end portions of said second actuator links and intermediate portions of said elongated grabbing elements adapted to permit the second actuator links to be swung between a position where said second actuator links are in substantial alinement and a position where the second actuator links are in oblique relation at the side of said pivotal connections between said second actuator links and said elongated grabbing elements adjacent said elongated hollow tubular member, means for limiting swinging movement of said second actuator links relative to said elongated grabbing elements and to each other away from said elongated hollow tubular member when the second actuator links are swung outwardly of alined relation, and means including an actuator rod slidably mounted in the elongated hollow tubular member and an actuator piece rigid with said actuator rod adapted to be manually actuated to engage and cause said second actuator links to be swung from a position of oblique relation to a position beyond alined relation.

VICTOR J. BENSON.

REFERENCES CITED

The following references are of record in the file of this patent:

UNITED STATES PATENTS

| Number | Name | Date |
|---|---|---|
| 406,546 | Taber | July 9, 1889 |
| 671,294 | Pennock | Apr. 2, 1901 |
| 964,375 | Bjornseth | July 12, 1910 |
| 980,212 | Dale | Jan. 3, 1911 |
| 1,171,440 | Immell | Feb. 15, 1916 |